Patented Jan. 11, 1949

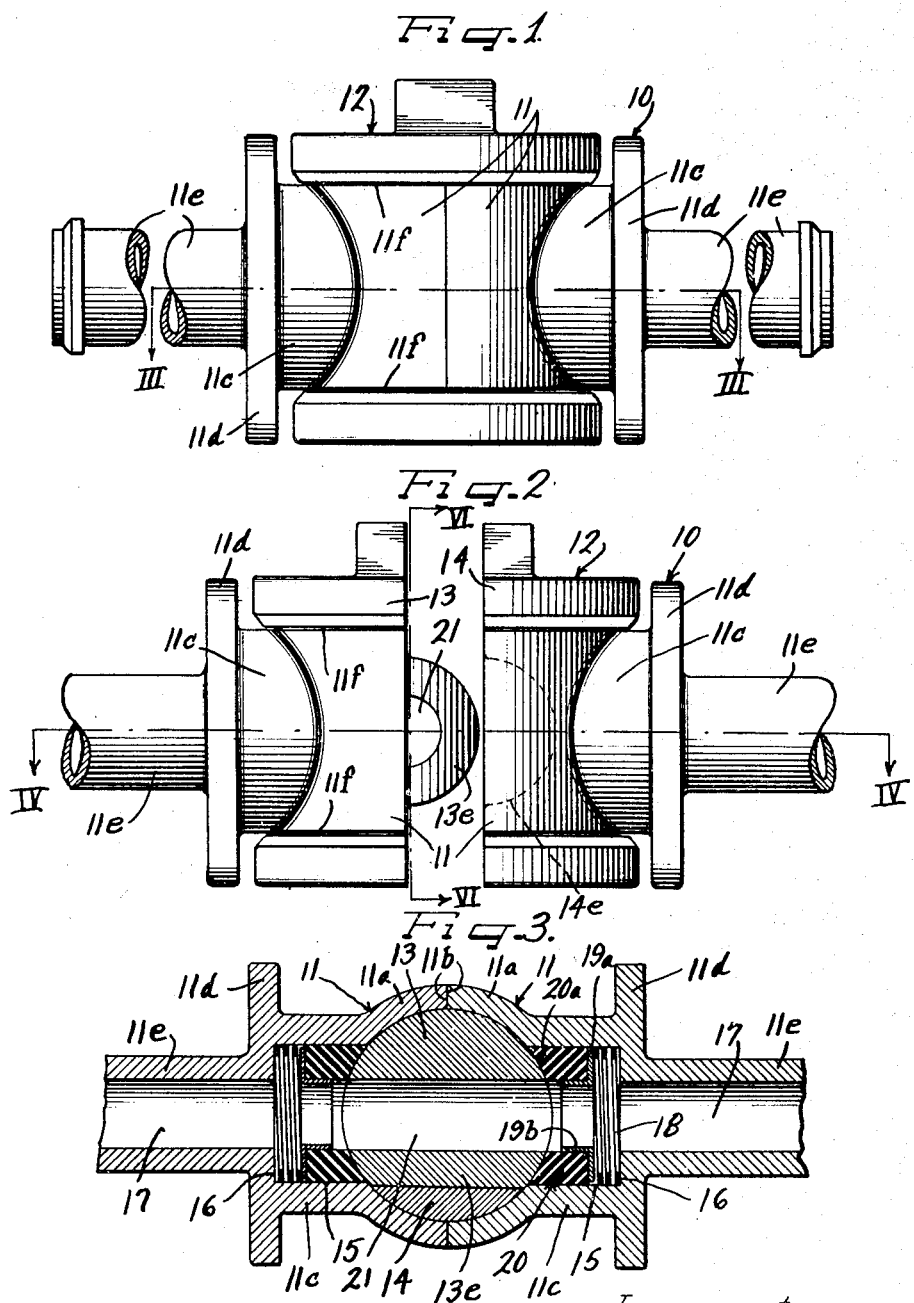

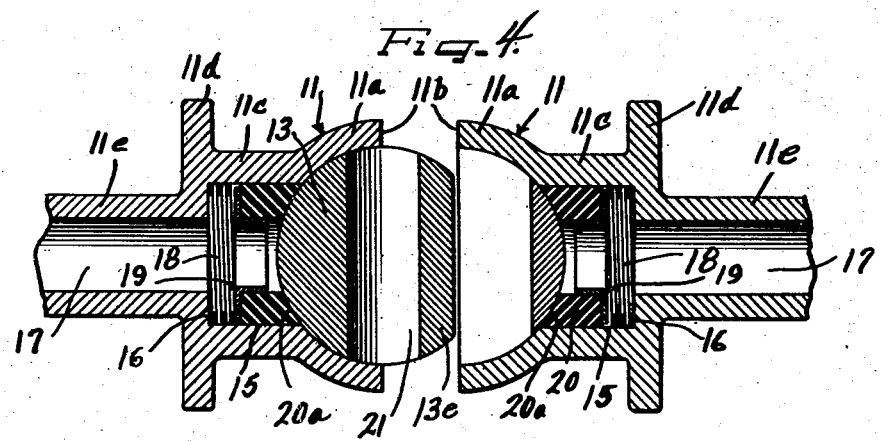
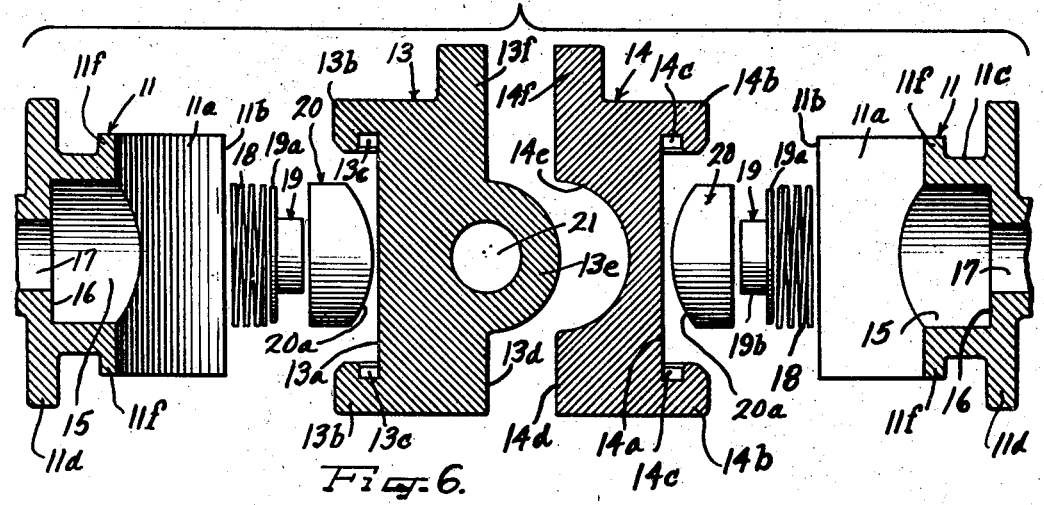
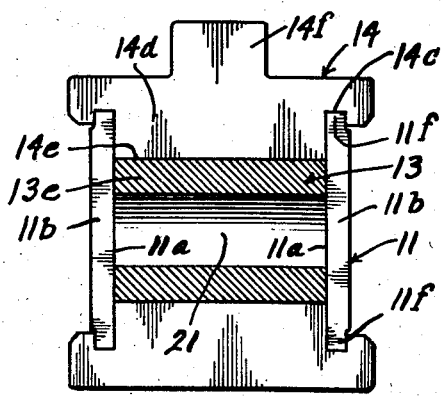

2,458,910

UNITED STATES PATENT OFFICE 2,458,910

QUICK DISCONNECT COUPLING

Paul P. Johnson, Willoughby, Ohio, assignor to Thompson Products, Inc., Cleveland, Ohio, a corporation of Ohio Application May 16, 1945, Serial No. 594,071

2 Claims. (Cl. 284—4)

This invention relates to self-sealing couplings of the type disclosed in the George H. Hufferd Patent 2,326,143 dated August 10, 1943, but having otherwise-necessary structure for readily aligning the coupling parts for the coupling operation.

Specifically this invention deals with self-sealing couplings which have identical mating coupling boxes and valve parts cooperating with said identical boxes to automatically align the boxes when they are brought together for the coupling operation.

In the Hufferd Patent 2,326,143 a self-sealing detachable coupling with cooperating male and female coupling boxes is disclosed. The male coupling box has side ears for fitting into recesses in the female coupling box. During the coupling operation these ears may slide sideways in the recesses of the female coupling box to slow up the coupling operation.

The present invention now provides a self-sealing detachable coupling having identical coupling boxes. These coupling boxes have flat mating end faces which can be more cheaply formed than the mating surfaces of the heretofore disclosed male and female coupling boxes. The identical coupling boxes of this invention rotatably receive a two-piece valve and integral cooperating tongue and groove means on the valve pieces and boxes serve to couple the boxes together when both valve pieces are moved into both boxes, and to retain a valve piece in each box when each valve piece is rotated into one box only. The valve pieces have mating faces with a recess through one face closed by the wall of the coupling box retaining this piece in uncoupled position, and with a protuberance on the mating face of the other valve piece for seating in the closed-ended recess to automatically align the valve pieces and coupling boxes for the coupling operation. The wall portions of the coupling boxes closing the ends of the recess in the one valve piece will eliminate end movement of the protuberance. The valve piece with the protuberance thereon has a conduit passage therethrough for connecting the ports of the coupling boxes in fluid flow communication when the valve is rotated to position the ends of the conduit passage in communication with the ports of the boxes.

This invention, therefore, utilizes otherwise-necessary structure in a quick disconnect coupling for aligning the coupling sections, and at the same time eliminates heretofore-required male and female coupling boxes.

It is, then, an object of this invention to provide self-sealing detachable couplings with otherwise-necessary structure so arranged to automatically align the coupling parts for a coupling operation.

A still further object of the invention is to provide self-sealing detachable couplings with identical coupling boxes.

A still further object of the invention is to provide quick disconnect couplings with identical coupling boxes arranged to coact with male and female valve pieces to automatically align the assembly for a coupling operation.

Other and further objects of the invention will be apparent to those skilled in the art from the following detailed description of the annexed sheets of drawings which, by way of a preferred example only, illustrate one embodiment of the invention.

On the drawings:

Figure 1 is a side elevational view of a coupling according to this invention illustrating the parts in coupled-together relation.

Figure 2 is a view similar to Figure 1 but illustrating the coupling parts in sealed disconnected relation.

Figure 3 is a horizontal cross-sectional view taken along the line III—III of Figure 1.

Figure 4 is a horizontal cross-sectional view taken along the line IV—IV of Figure 2.

Figure 5 is an exploded vertical cross-sectional view, with parts in elevation, of the parts of the coupling shown in Figures 1 to 4.

Figure 6 is a vertical cross-sectional view with parts in end elevation taken along the line VI—VI of Figure 2.

As shown on the drawings:

In Figures 1 and 2 the reference numeral 10 designates generally a quick disconnect coupling of this invention. The coupling 10 is composed of two identical coupling boxes 11, 11 and a split plug valve 12 having a male valve segment 13 and a female valve segment 14.

As shown in Figures 3 to 5, each coupling box 11 has a fragmental cylindrical side wall 11a with a flat planar end face 11b. When the coupling boxes 11 have the mating end faces 11b thereof abutted together, the cylindrical side walls 11a define an open-ended cylindrical valve-operating chamber. An integral neck 11c projects laterally from each coupling box 11 and a mounting flange 11d is provided on each neck 11c. A nipple 11e projects from each neck 11c beyond the flange 11d.

A port 15 is provided in each neck 11c. The port 15 opens at one end into the valve-operating chamber provided by the cylindrical side walls 11a and has a shoulder 16 at the other end thereof. A conduit passage 17 through the nipple 11e communicates with the shouldered end of the port.

A coil spring 18 is seated in the port 15 and bottomed on the shoulder 16. A retainer 19 has a flange 19a acted on by the spring 18 and a forwardly projecting neck or sleeve 19b seated in a resilient sleeve 20 composed of rubber, neoprene, or the like sealing material. The sleeve 20 has a dished end face 20a for fitting around a portion of the cylindrical plug valve 12. The spring urges the dished end face 20a of the sleeve 20 into sealing engagement with the plug valve. The arrangement is such that the seal assembly will not impede the flow of fluid through the passage 17 since the inner diameters of the sleeve and retainer are substantially the same as the diameter of the passage 17.

Upstanding semi-annular tongues or ways 11f are provided on the top and bottom ends of the cylindrical side walls 11a of each coupling box 11, as best shown in Figures 5 and 6. The male segment 13 of the plug valve has a semi-cylindrical side wall 13a with overhanging lips 13b at the ends thereof. Semi-annular grooves or ways 13c are formed in the lips 13b to receive the tongues 11f of the coupling boxes.

The valve segment 13 has a flat mating end face 13d with a semi-cylindrical protuberance 13e thereon. A conduit passage 21 is formed through the valve segment 13. This passage 21 is normal to the cylindrical side wall 13a for joining the ports of the coupling boxes as will be more fully hereinafter described.

A lug segment 13f projects from the top wall of the valve segment 13.

The valve segment 14 has a semi-cylindrical side wall 14a with overhanging lips 14b at the ends thereof and grooves 14c in the lips. A flat end face 14d is provided on the valve segment 14 for mating with the face 13d of the valve segment 13. A semi-cylindrical recess 14e is formed through the face 14d to receive the protuberance 13e of the valve segment 13. A lug segment 14f is provided on the top wall of the valve segment 14 to cooperate with the segment 13f to form a square or rectangular tool-receiving turning lug.

When the coupling boxes are in disconnect position shown in Figures 2 and 4, the tongues 11f of one coupling box 11 receives only the grooves 13c of the valve segment 13 and the cylindrical wall 13a of this valve segment closes the port of the box in sealing engagement with the resilient sleeve 20. The other valve segment 14 has the grooves 14c thereof receiving only the tongues 11f of the other coupling box and the cylindrical side wall 14a of this valve segment closes the port of this coupling box. The faces 13d and 14d of the valve segments are substantially flush with the mating faces 11b of the separated boxes. The recess 11e of the valve segment extends across the flush face 14d of the valve segment and is closed at its ends by the walls 11a of the coupling box. The protuberance 13e of the valve segment 13 projects beyond the flush face 13d of the valve segment. Thus the coupling boxes, in uncoupled position, have the passages 17 thereof respectively sealed by the valve segments 13 and 14, and each valve segment is retained by a coupling box.

To couple the boxes 11 together as shown in Figures 1 and 3, the boxes are positioned so that the lug segments 13f and 14f of the valve segments are on the same side and the protuberance 13e of the valve segment 13 is then seated in the recess 14e. This seating of the protuberance automatically aligns the valve for the coupling operation. As illustrated in Figure 6, the protuberance 13e is retained against endwise movement in the recess 14e by the side walls 11a of the coupling box. The mating faces 13d and 14d of the valve segments are then brought together and this automatically brings the mating faces 11b of the coupling boxes together. The valve is then rotated 90° in the cylindrical chamber provided by the mated-together coupling boxes. This rotation of the valve places the conduit passage 21 in alignment with the ports of the coupling boxes to join the passages 17 in full fluid flow communication. At the same time the grooves 13c and 14c of the valve segments are moved into engagement with the tongues 11f of both coupling boxes to couple the boxes together.

From the above descriptions it should be understood that this invention provides a quick disconnect coupling with identical coupling boxes having flat mating end faces that are automatically brought into alignment by otherwise necessary structure including interfitting male and female valve parts and coupling box walls.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A self-sealing detachable coupling comprising a pair of identical ported coupling boxes having chamber-defining walls with flat mating end faces and defining when said faces are mated together a valve-operating chamber, a split plug valve rotatable in said chamber to couple the boxes together and connect the ports of the boxes in fluid flow communication, means retaining a valve segment in each box to close the ports thereof when the boxes are disconnected, a valve segment retained by one box having a mating face with a recess therethrough closed at the ends by the box when the segment is in uncoupled position, a valve segment retained by the other box having a cooperating mating face with a passaged protuberance readily seatable in the closed-ended recess to laterally align the boxes for coupling, said protuberance passage having both ends exposed in the uncoupled position of said other box to drain fluid therefrom and said passage forming a conduit connecting the ports of the boxes when the valve is rotated to couple the boxes.

2. A quick disconnect coupling comprising a pair of identical coupling boxes with chamber-defining side walls having flat planar mating end faces and defining when mated together a valve-operating chamber, mating male and female valve segments with a passaged protuberance on one segment and a recess in the other segment coacting with said protuberance to align the coupling boxes, said coupling boxes having side walls for restricting endwise movement of the protuberance in the male valve segment when it is seated in the female recess, and cooperating means on the coupling boxes and valve segments for joining the coupling boxes in coupled position wherein said protuberance passage provides fluid flow through said boxes and for retaining a valve segment in each coupling box when the boxes are uncoupled, said protuberance passage having both ends exposed in the uncoupled position of said boxes to drain fluid therefrom.

PAUL P. JOHNSON.

REFERENCES CITED

The following references are of record in the file of this patent:

UNITED STATES PATENTS

| Number | Name | Date |
| --- | --- | --- |
| 2,333,496 | Townhill et al. | Nov. 2, 1943 |
| 2,357,232 | Snyder et al. | Aug. 29, 1944 |
| 2,373,925 | Townhill | Apr. 17, 1945 |